United States Patent
Fick et al.

(10) Patent No.: US 10,836,088 B2
(45) Date of Patent: Nov. 17, 2020

(54) METHOD FOR REPRODUCING INJECTION MOLDED PARTS OF QUALITY AND INJECTION MOLDING UNIT FOR PERFORMING THE METHOD

(71) Applicant: KISTLER HOLDING AG, Winterthur (CH)

(72) Inventors: Daniel Fick, Kreuzlingen (CH); Dirk Meyer, Stuttgart (DE); Philipp Liedl, Stuttgart (DE)

(73) Assignee: KISTLER HOLDING, AG, Winterthur (CH)

( * ) Notice: Subject to any disclaimer, the term of this patent is extended or adjusted under 35 U.S.C. 154(b) by 452 days.

(21) Appl. No.: 15/960,831

(22) Filed: Apr. 24, 2018

(65) Prior Publication Data
US 2018/0304513 A1 Oct. 25, 2018

(30) Foreign Application Priority Data
Apr. 25, 2017 (EP) ..................................... 17167977

(51) Int. Cl.
*B29C 45/77* (2006.01)
*B29C 45/76* (2006.01)

(52) U.S. Cl.
CPC ............ *B29C 45/77* (2013.01); *B29C 45/766* (2013.01); *B29C 2945/7601* (2013.01);
(Continued)

(58) Field of Classification Search
CPC ....................................................... B29C 45/77
See application file for complete search history.

(56) References Cited

U.S. PATENT DOCUMENTS

| | | | |
|---|---|---|---|
| 4,889,667 | A | 12/1989 | Kojima et al. |
| 5,296,174 | A | 3/1994 | Yakemoto et al. |

(Continued)

FOREIGN PATENT DOCUMENTS

| | | |
|---|---|---|
| CN | 1541825 | 11/2004 |
| DE | 4208 940 | 9/1992 |

(Continued)

OTHER PUBLICATIONS

Japanese Office Action and English Translation thereof, Japanese Application No. 2018-083107, dated Jun. 25, 2019.
(Continued)

*Primary Examiner* — Larry W Thrower
(74) *Attorney, Agent, or Firm* — Dority & Manning, P.A.

(57) ABSTRACT

A time variation of an internal pressure of the molding cavity of a multi-phase injection molding machine is detected and represented as an internal pressure graph. An internal pressure graph recorded during a production cycle that produced an injection molded part satisfying a predefined quality characteristic is used as a reference graph. If the internal pressure graph of the current production cycle exceeds a predefined threshold value, then a current machine parameter is changed so as to adapt an internal pressure graph of a subsequent production cycle to the reference graph. Each phase of the production cycle is assigned its own machine parameter determined to have a significant impact on the quality of the parts produced. The assigned machine parameters are changed in a predefined order in a plurality of production cycles wherein exactly one assigned machine parameter is changed per production cycle.

16 Claims, 4 Drawing Sheets

(52) U.S. Cl.
CPC ............. *B29C 2945/7604* (2013.01); *B29C 2945/76006* (2013.01); *B29C 2945/7611* (2013.01); *B29C 2945/76257* (2013.01); *B29C 2945/76397* (2013.01); *B29C 2945/76414* (2013.01); *B29C 2945/76498* (2013.01); *B29C 2945/76531* (2013.01); *B29C 2945/76545* (2013.01); *B29C 2945/76551* (2013.01); *B29C 2945/76595* (2013.01); *B29C 2945/76658* (2013.01); *B29C 2945/76732* (2013.01); *B29C 2945/76859* (2013.01); *B29C 2945/76892* (2013.01); *B29C 2945/76939* (2013.01); *B29C 2945/76943* (2013.01)

(56) References Cited

U.S. PATENT DOCUMENTS

| | | |
|---|---|---|
| 5,945,046 A | 9/1999 | Heel et al. |
| 7,866,971 B2 | 1/2011 | Cadonau et al. |
| 8,281,664 B2 | 10/2012 | Waser et al. |
| 9,149,965 B2 | 10/2015 | Nielsen |
| 9,387,617 B2 | 7/2016 | Gruber et al. |
| 2018/0304513 A1 | 10/2018 | Fick et al. |

FOREIGN PATENT DOCUMENTS

| | | |
|---|---|---|
| DE | 195 36 566 | 2/1997 |
| EP | 0228799 | 7/1987 |
| EP | 0233 548 | 8/1987 |
| EP | 0 897 786 | 2/1999 |
| EP | 2 583 811 | 4/2013 |
| JP | S5214658 | 2/1977 |
| JP | S59224323 | 12/1984 |
| JP | S6260619 | 3/1987 |
| JP | S62104727 | 5/1987 |
| JP | S6313727 | 1/1988 |
| JP | H03197115 | 8/1991 |
| JP | H05147085 | 6/1993 |
| JP | 2001113573 | 4/2001 |

OTHER PUBLICATIONS

Chinese Office Action and English Translation, dated Dec. 27, 2019, 11 pages.

Extended European Search Report (EP 17167877.2-1706), dated Oct. 24, 2017.

METHOD FOR REPRODUCING INJECTION MOLDED PARTS OF QUALITY AND INJECTION MOLDING UNIT FOR PERFORMING THE METHOD

TECHNICAL FIELD

The present invention relates to a method for reproducing high quality injection molded parts as well as to an injection molding unit for performing the method.

BACKGROUND

Injection molding is an important forming process in which an injection molding unit is operated repeatedly and successively through its production cycle to produce large quantities of finished injection molded parts. Desirably, each finished part can have a complex geometry with a consistently high quality. Each production cycle of the injection molding unit typically includes three phases. During an injection phase, a melt is injected under pressure into a cavity of an injection mold. Once the cavity is completely filled by melt, the melt is solidified in a holding pressure phase during which period the molten melt cools down. In a residual cooling phase, the solidified melt continues to cool down within the cavity, and at the end of the residual cooling phase the finished injection molded article is ejected from the cavity. Injection molding is a cyclic production process in which the three phases are executed one after the other in repeating production cycles. The melt can be one of plastic, metal, ceramics, etc.

The three phases are important for determining the quality of the injection molded part produced. In other words, depending on how machine parameters of the injection molding unit are set by the operators, the injection molded part produced will meet at least one predefined quality characteristic. Thus, in the injection phase in which the melt is injected under high pressure into the cavity, an injection speed serves as the machine parameter that is set by the operator to determine the quality of the injected molded part. In the holding pressure phase where an internal pressure is maintained in the cavity, the machine parameter that is set to determine the quality of the injected molded part is a holding pressure level. As the injection molding machine transitions between the injection phase and the holding phase, the machine parameter that is set to determine the quality of the injected molded part must be switched from the injection speed to the holding pressure level. If the operator switches to the holding pressure level too early, then the injection molded part will be incompletely formed. If the operator switches to the holding pressure level too late, then the injection molded part will suffer from mechanical tension, thus compromising the integrity of the injection molded part. In both cases, poor injection molded parts or bad parts will be produced that do not meet the predefined quality characteristic. An injection molding process that minimizes the number of bad parts produced over a given unit of time is desirable. Achieving this goal is difficult, however, because even the composition and viscosity of the melt may not always be identical during successive cycles of operation of the injection molding unit. Similarly, environmental factors such as pressure and temperature of the atmosphere may change during successive cycles of operation of the injection molding unit. Many bad parts can be produced before the operator realizes that one or more of the machines parameters must be changed in order to operate the machine to produce finished parts of acceptable quality. Moreover, before the operator identifies what machine parameter needs changing and the magnitude of that change, many additional bad parts can be produced or the machine is rendered inoperative while these determinations are being made and production time on the machine is lost.

The document EP0897786B1 discloses a method for controlling an injection molding unit in which for determining the switchover point a variation of an internal pressure of the cavity with time is detected by a pressure sensor and is represented as an internal pressure graph by an evaluation unit. A cycle time of a typical production cycle takes a few seconds. The variation of the internal pressure with time is detected by a piezoelectric pressure sensor having a sampling frequency of 1 kHz. Filling of the cavity with melt during the injection phase results in a significant increase in pressure in a short time of less than one second. The switchover point is the time point immediately before a maximum internal pressure is detected. During this pressure increase, the melt is compressed. The maximum internal pressure may be 500 bar and higher. Displaying of the internal pressure graph takes place in a fraction of a second after the end of the current production cycle. An injection molded part produced meeting the predefined quality characteristic is called a good part. The internal pressure graph of a production cycle in which a good part has been produced is called the reference graph. Such a reference graph can be stored in and retrieved from an electronic data memory of the evaluation unit.

According to EP0897786B1, an internal pressure graph measured in the current production cycle is compared to a reference graph. This comparison determines whether the detected internal pressure graph exceeds a predefined threshold value of a machine parameter. If the detected internal pressure graph exceeds the threshold value, then a machine parameter will be readjusted. For example, for determining the machine parameter holding pressure level, the detected internal pressure graph is integrated in the area of 90% of the maximum internal pressure and compared to a corresponding integral of the reference graph. If the integral of the graph of the detected internal pressure exceeds a threshold value, then the machine parameter holding pressure level will be readjusted to adapt the graph of the detected internal pressure in the subsequent production cycle to the reference graph and, thus, to reproduce the desired quality of the injection molded part. However, in order to implement this method, it is necessary to provide sufficient reaction time for controlling the injection molding unit, and the provision of this reaction time lengthens the duration of each molding cycle that the injection machine is capable of performing while producing an acceptable proportion of high quality parts.

SOME OBJECTS AND SUMMARY DESCRIPTION OF THE INVENTION

One exemplary object of the present invention is to further improve the reproduction of quality injection molded parts. Another example of an object of the invention is to achieve said reproduction of quality injection molded parts in the shortest possible cycle time. Furthermore, it is an object of the invention to provide said reproduction of the injection molded part quality in a minimal number of production cycles. Moreover, it is an object of the invention to display the setting of machine parameters in the reproduction of the injection molded part quality in a clear and transparent manner to an operator. These and other features, aspects and advantages of the present invention will become better understood with reference to the detailed description of exemplary embodiments and appended claims. The following summary description highlights some of the aspects of the invention.

The invention relates to a method for operating an injection molding machine, which runs a multiple-phase production cycle, to produce injection molded parts that consistently attain a desired quality. In an injection phase of the multiple-phase production cycle, a melt is injected into a cavity of the injection mold of an injection molding machine. There ensues in the multiple-phase production cycle a holding pressure phase in which the melt in the cavity is solidified. The multiple-phase production cycle then includes a residual cooling phase in which the solidified melt has continued to cool down prior to being ejected from the molding cavity of the injection molding machine. At the end of residual cooling phase, the melt is ejected from the cavity as the injection molded part. At the outset of each of these production cycles, the injection molding machine is operating under a plurality of pre-set operating parameters, which include for example the injection speed with which the melt is injected via the sprue into the cavity of the mold. The method of the present invention calls for measuring how an internal pressure of the cavity varies with time during all of the phases for each production cycle and representing this measured pressure data for that production cycle as an internal pressure graph that characterizes the performance of the injection molding unit during one cycle of the multiple-phase production cycle. The method of the present invention relies on a reference graph that represents how the same internal pressure of the cavity varied over time during a production cycle in which was produced a finished injection molded part that met at least one predefined quality characteristic. The method of the present invention calls for comparing the internal pressure graph of a current production cycle with the reference graph. This comparison focuses on certain of the internal pressure graph's portions and/or features that are particularly sensitive indications of the injection molding unit's performance affecting whether the finished injected molded part will exhibit at least one characteristic having the desired quality. The method of the present invention calls for identifying a deviation of the internal pressure graph of a current production cycle from the reference graph that will trigger an adjustment in an operating parameter of the injection molding unit. Such deviation must exceed a predefined threshold value of the identified portion or feature of the cavity's internal pressure graph before triggering such adjustment of an operating parameter of the injection molding unit. If the comparison reveals that the internal pressure graph of a current production cycle exceeds the predefined threshold value of the noted deviation from the internal pressure of the reference graph, then the method of the present invention calls for adjusting a particular current machine parameter in a way that tends to eliminate the deviation of the internal pressure graph of a subsequent production cycle relative to the reference graph.

The method of the present invention calls for assigning to individual features or portions within each phase of the production cycle, a particular machine parameter that has a greater influence on the internal pressure in that phase of the production cycle than non-assigned machine parameters. The method of the present invention also calls for changing in each production cycle, exactly one assigned machine parameter such that over successive production cycles in the course of multiple production cycles, the assigned machine parameters become changed successively in a predefined order. Thus, at the conclusion of any single production cycle, only one of the operating parameters of the injection molding machine will undergo an individual adjustment before the injection molding machine begins the next successive production cycle. Moreover, the particular one of the operating parameters that will change with each successive production cycle will follow a predefined order, i.e., if an adjustment is called for after the first production cycle then starting with an adjustment to a first operating parameter of the machine, then if an adjustment is called for after the second production cycle a second operating parameter of the machine will undergo an adjustment, then if an adjustment is called for after the third production cycle a third operating parameter of the machine will undergo an adjustment, then if an adjustment is called for after the fourth production cycle a fourth operating parameter of the machine will undergo an adjustment, and then if an adjustment is called for after the fifth production cycle the machine will undergo an adjustment back to the first operating parameter of the injection molding machine.

Unlike EP0897786B1, the present invention discloses a method of changing of machine parameters rather than one of controlling by control parameters. The invention is based on the finding that in each particular phase of injection molding, there is a machine parameter that can be identified as the one machine parameter that influences the internal pressure in this phase more strongly than other machine parameters, and accordingly focusing on adjusting this identified machine parameter of greatest influence when a deviation from the reference graph of the internal cavity pressure is detected. By changing the machine parameter having the greatest influence on the internal pressure of the cavity, then the internal pressure graph is more quickly able to be adjusted to the reference graph in a phase-specific manner.

Preferably, during each phase of a given production cycle of the injection molding machine, a value of an assigned machine parameter to be changed is displayed to the operator on at least one output device. Thus, the operator can set the value of the assigned machine parameter to be changed at the injection molding unit. The operator is instructed as to how and in which order the machine parameters are to be changed, and these instructions are displayed to the operators in a clear and transparent manner.

Thus, associated with each phase of injection molding, there is a machine parameter that has a greatest impact on internal pressure in the cavity during that phase. However, that same machine parameter having the greatest impact in one phase of the injection molding cycle, also may have an impact on the internal pressure in the cavity during the other phases of the injection molding cycle, even though that impact in the other phases may be less than the impact of another machine parameter. Therefore, in order to reduce the influences of the machine parameters that act across several phases of a single production cycle of the machine, the machine parameters that are adjusted after the comparison yields a deviation from the reference graph, are changed in a predefined order in a plurality of successive subsequent production cycles. This order is predefined in a way that improvements in adapting the detected internal pressure graph to the reference graph that have been achieved with a first machine parameter are not partly reversed by the other machine parameters. Thus, to ensure that the resulting injection molded part meets the predefined quality characteristic, effective adapting of the detected internal pressure graph to the reference graph is performed in a short cycle time and moreover in a small number of production cycles.

BRIEF DESCRIPTION OF THE DRAWINGS

The accompanying drawings, which are incorporated in and constitute a part of this specification, illustrate embodiments of the invention and, together with the description, serve to explain the principles of the invention. In the following brief descriptions of the figures in which.

DETAILED DESCRIPTION OF EXEMPLARY EMBODIMENTS OF THE INVENTION

Figure 1:
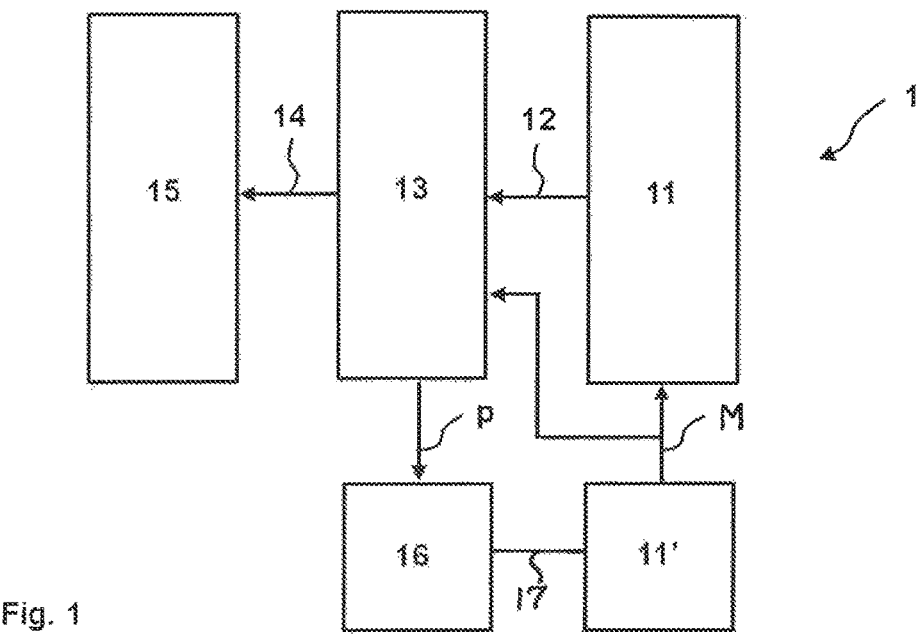
FIG. 1 is a schematic representation of a portion of an injection molding unit for producing injection molded parts in production cycles.

The method of the invention for reproducing the injection molded part quality in injection molding can be used on any injection molding unit 1 that is commercially available and known to those skilled in the art. As schematically represented in FIG. 1, an injection molding unit 1 comprises an injector 11 in which a melt 12 is liquefied. The melt 12 can be one of plastic, metal, ceramics, etc. The injection molding unit 1 comprises an injection mold 13 having a molding cavity into which the liquefied melt 12 is injected under pressure by the injector 11. The melt 12 injected into the cavity is solidified in the cavity and cools down to form a finished injection molded part 14. At the end of the production process, the injection molding unit 1 ejects a finished injection molded part 14 from the cavity of the injection mold 13. The injection molding unit 1 includes a pressure sensor that is arranged, preferably in the cavity, so as to measure how an internal pressure p within the cavity varies with time, and the injection molding unit 1 records such time variation of internal pressure p within the cavity of the injection mold 13. The pressure sensor may be a piezoelectric pressure sensor, for example. The injection molding unit 1 desirably includes a temperature sensor for capturing a variation of a temperature within the cavity of the injection mold 13 with time. For example, the temperature sensor may be a thermocouple, and the injection molding unit 1 records such time variation of internal temperature within the cavity of the injection mold 13.

As schematically represented in FIG. 1, the injection molding unit 1 comprises a control unit 15 to that is configured for inspecting the finished molded part 14 and determining whether the finished part 14 satisfies at least one predefined quality characteristic of a desired finished part. Examples of possible predefined quality characteristics include a weight, a dimensional accuracy, a size, a burr formation, a cavity fill, a burn mark, etc. The control unit 15 can include a plurality of sensors, which can include for example visual inspection sensors, weight sensors, and the like. The control unit 15 also can include a computer programmed to receive signals from the sensors and convert same into information indicative of various predetermined quality characteristics of the finished part 14 that is being inspected and compare the sensed characteristics to a predetermined standard for the particular quality characteristic of interest. If the finished injection molded part 14 conforms to the predefined quality characteristic, then the control unit 15 deems the finished injection molded part 14 to be a good part. However, if the finished injection molded part 14 fails to conform to the predefined quality characteristic, then the control unit 15 deems the finished injection molded part 14 to be a bad part.

Figure 2:
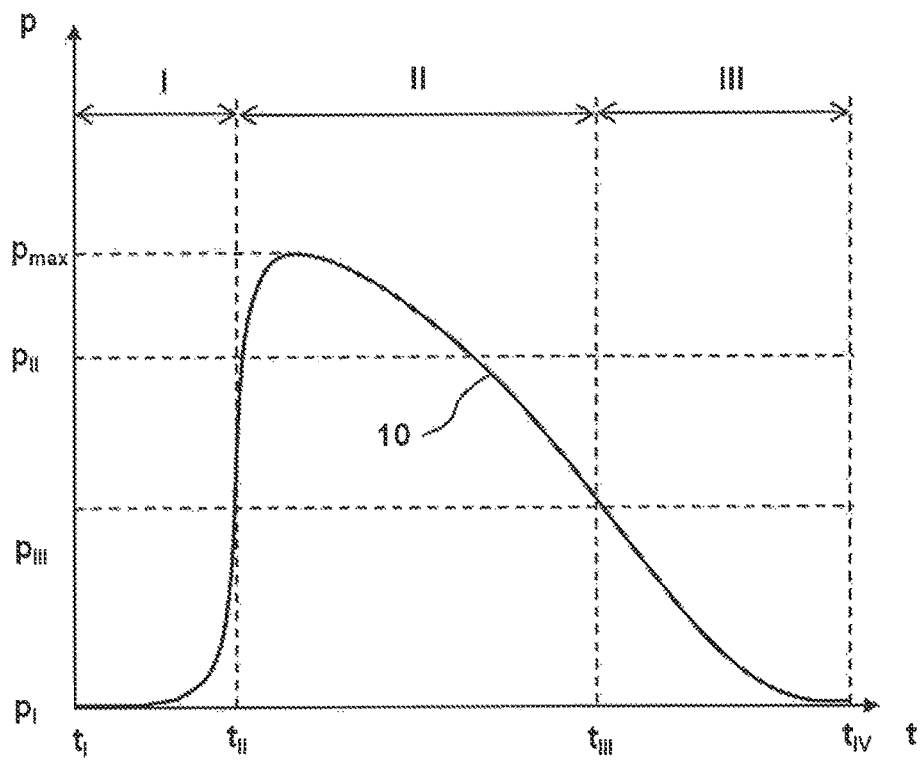
FIG. 2 is a graphic representation of an internal pressure graph of a production cycle of an injection molding unit according to FIG. 1 leading to a good part and accordingly is used as the reference graph.

As schematically represented in FIG. 1, the injection molding unit 1 comprises an evaluation unit 16 that is configured for generating internal pressure graphs such as shown in FIG. 2 for example. The evaluation unit 16 receives at a given moment of time t from the pressure sensor that monitors the pressure within the cavity of the injection mold 13, a signal representing the pressure within the cavity at that moment of time t. The evaluation unit 16 records a plurality of such signals over a predetermined duration of time and generates the internal pressure graph 10 shown in FIG. 2 for example and representing the detected time variation of internal pressure p within the cavity of the injection mold 13. In the context of the present invention, this is also called the detected internal pressure graph for a given operating cycle of the injection molding unit 1. To this end, the evaluation unit 16 comprises at least one output device such as a screen of a computer monitor, etc., for providing a visual representation of the recorded data in the form of a detected internal pressure graph. Each of FIGS. 2 to 7 shows an exemplary internal pressure graph 10 for a good part, and this internal pressure graph 10 representing a good part is also called the reference graph 10. Alternatively, the evaluation unit 16 can provide such visual representation in the form of a table of the recorded data.

In FIGS. 2 to 7, the times $t_I$ to $t_{VI}$ and pressures $p_I$ to $p_{III}$ and $p_{max}$ refer to the reference graph 10. Reference graph 10 can be stored by the evaluation unit 16 in an electronic data memory from which the reference graph 10 can be retrieved by the evaluation unit 16 and displayed visually on the output device for observation by the operator of the injection molding unit 1. The injection mold 13 may have a plurality of cavities, and for each respective one of these cavities there may exist a reference graph 10 that is specifically pertinent to that respective cavity. Those skilled in the art being aware of the present invention may design the evaluation unit 16 as an integral part of the injection molding unit 1, or may design the evaluation unit 16 and its components as a unit separate from the injection molding unit 1. Thus, the evaluation unit 16 may be spatially remote from the injection molding unit 1 and able to communicate with the injection molding unit 1 via the Internet for example. The output unit also may be a screen of a mobile computing device such as a laptop computer, a tablet computer, a smartphone, etc.

Injection molding is a cyclic production process in which the injection molding unit 1 performs repetitive production cycles in succession one after the other. Each individual production cycle performed by the injection molding unit 1 goes through three successive phases I to III that are critical for determining the quality of the finished part 14. Phases I to III now will be explained referring to FIG. 2. In an injection phase I, the liquefied melt 12 is injected into the cavity of an injection mold 13 through a sprue. The injection phase I starts at a first moment in time $t_I$ when the internal pressure within the cavity of the injection mold 13 is measured by a pressure sensor to be at an internal pressure $p_I$. The end of the injection phase I occurs at a second and subsequent moment in time $t_{II}$ when the internal pressure within the cavity of the injection mold 13 is measured by a pressure sensor to be at an internal pressure $p_{II}$, which is known as the fill pressure. Upon attaining the end of the injection phase I, the cavity of the injection mold 13 is filled with melt 12.

As schematically shown in FIG. 1, the injector 11 comprises a control device 11' that is configured for controlling the liquefaction and injection of the melt 12 into the cavity of the injection mold 13. The control device 11' is configured with the capability of changing a machine parameter M that determines the injection speed with which the injector 11 injects the melt 12 into the cavity of the injection mold 13. The greater the injection speed, the faster the cavity will be filled with melt 12. For this purpose, the control device 11' comprises an input device for entering at least one machine parameter M that determines the injection speed with which the injector 11 injects the melt 12 into the cavity of the injection mold 13.

As schematically shown in FIG. 2 for example, during filling of the cavity with melt 12 in the injection phase I, the internal pressure p measured within the cavity of the injection mold 13 rises up to a maximum internal pressure $p_{max}$ in a short period of time. Just before the moment in time when the pressure sensor detects the maximum internal pressure $p_{max}$ within the cavity, the cavity has become completely filled with melt 12 and the injection phase I is completed. As noted above, the pressure $p_{II}$ in the cavity that is completely filled with melt 12 is called the fill pressure $p_{II}$. The moment in time $t_{II}$ when the cavity is completely filled with melt is also called the switchover point $t_{II}$.

At the switchover point $t_{II}$, the holding pressure phase II of the production cycle of the injection molding unit 1 begins. During the holding pressure phase II, the injector 11 maintains a holding pressure $p_{II}$ on the melt 12 within the cavity via the sprue, and the melt 12 begins to cool. The cooling melt undergoes a reduction in volume, which if left uncompensated would mean that the shrunken melt would accordingly no longer completely fill the cavity. However, more melt 12 is allowed to flow through the sprue into the cavity in order to compensate for shrinkage of the cooling melt 12. In the holding pressure phase II of the production cycle, the control unit 11' reduces the internal pressure p until a sealing point pressure $p_{III}$ is attained within the cavity and the melt 12 is sufficiently cooled to become solidified. The holding pressure phase II begins at the moment in time $t_{II}$ known as the switchover point and ends at a moment in time $t_{III}$ with the attainment of the sealing point pressure $p_{III}$.

At the switchover point $t_{II}$, the injection molding unit 1 uses a holding pressure $p_{II}$ as the machine parameter M2 of interest instead of the injection speed as the machine parameter M1 to be used to determine whether finished parts 14 of the predetermined quality will be produced. The magnitude of the holding pressure $p_{II}$ and the duration of the holding pressure phase II (by adjusting when the time $t_{III}$ occurs) may be changed by the control device 11' as machine parameters M of interest to be used to determine whether finished parts 14 of the predetermined quality will be produced. As schematically shown in FIG. 2 for example, the magnitude of the holding pressure $p_{II}$ influences a level of the internal pressure p, especially in the range of the maximum internal pressure $p_{max}$ where the melt 12 is compressed for a short time and the internal pressure p is higher than the filling pressure $p_{II}$. The duration of the holding pressure phase II has an impact on how fast the internal pressure p in the cavity is reduced.

As schematically shown in FIG. 2 for example, the residual cooling phase III of the production cycle of the injection molding unit 1 begins at the time $t_{III}$, and the solidified melt 12 continues to cool down during the course of the ensuing residual cooling phase III. The time $t_{III}$ is also called the sealing point $t_{III}$ because it is at this time $t_{III}$ that the melt 12 in the region of the sprue is solidified to an extent that no further melt 12 is able to flow into the cavity and thus the sprue of the cavity is sealed. As schematically shown in FIG. 2 for example, the residual cooling phase III ends at the time $t_{IV}$ when the finished injection molded part 14 is ready to be ejected from the cavity.

The injection molding unit 1 can include conventional cooling means for reducing the temperature within the injection mold 13 and cooling the contents thereof. The control device 11' is configured so that it can change temperature of the cavity so that the cavity is cooled more or less strongly in the holding phase II and the residual cooling phase III. So that the injection molding unit 1 can produce finished parts 14 that satisfy the predetermined quality characteristic in the face of changing conditions, in accordance with the present invention the control device 11' is configured so that the control device 11' can change temperature of the cavity as one of the machine parameters M that can be adjusted in order to adapt the operation of the injection molding unit 1.

In accordance with the present invention, it is assumed that if the internal pressure graph 10.M0 of the current production cycle Z0 does not deviate by more than a predetermined threshold value from the reference graph 10 in a focus region of the pressure graph 10.M0 that is deemed to be pertinent to predict a quality characteristic of the finished part 14 that is of interest, then a good part will be produced. This assumption may be confirmed by the control unit 15 performing a quality control assessment of the finished injection molded part 14 produced in the current production cycle Z0.

Figure 8:
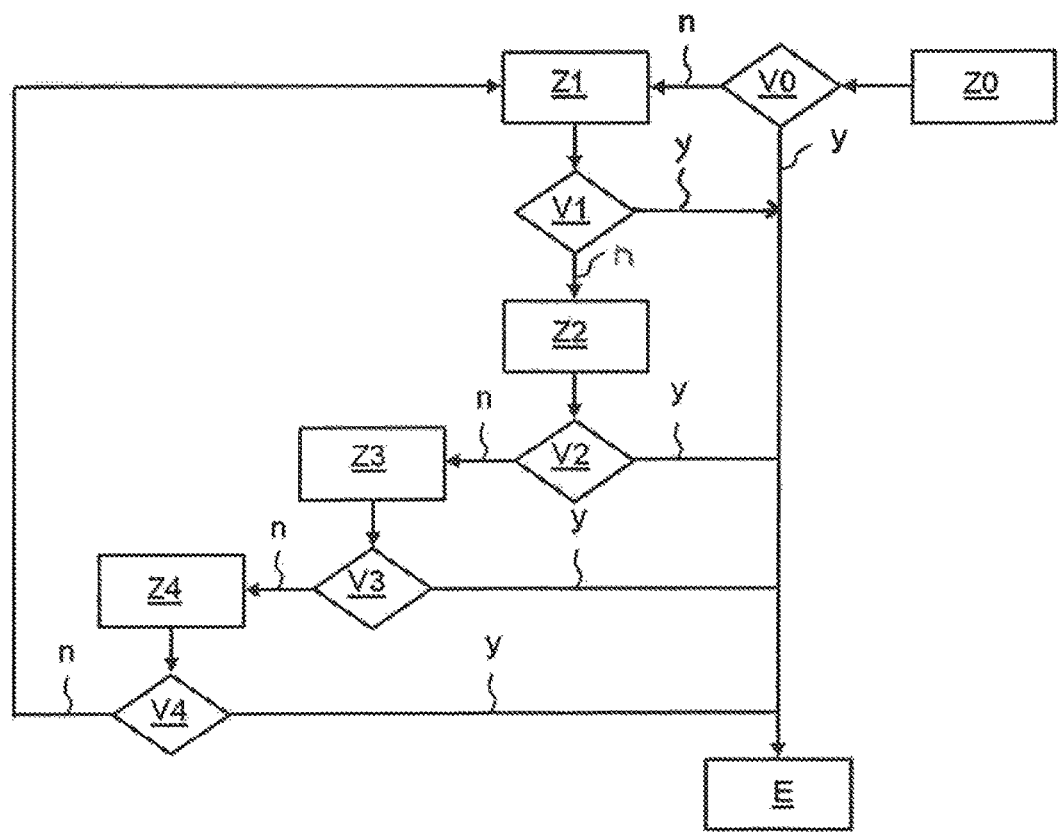
FIG. 8 is a schematic representation of elements of the process steps according to the invention.
Figure 3:
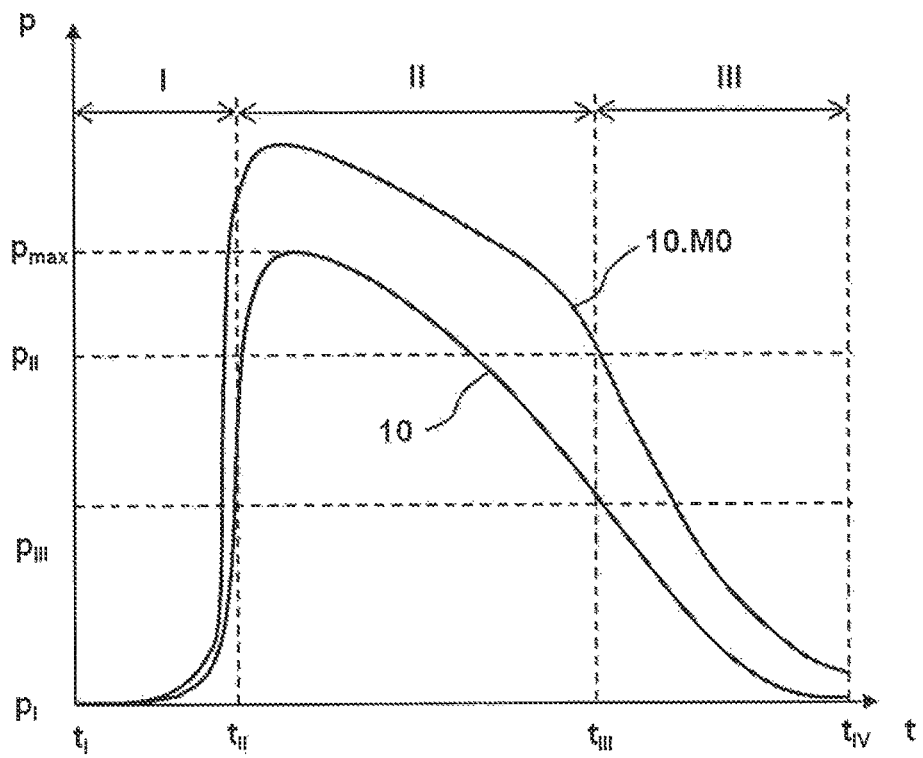
FIG. 3 is a graphic representation of the reference graph according to FIG. 2 and an internal pressure graph of a current production cycle of the injection molding unit according to FIG. 1.

As schematically shown in FIG. 8 for example, in order to adapt the operating conditions of the injection molding unit 1 to continue producing parts satisfying the desired quality as quickly as possible in the face of changing conditions (e.g., environmental conditions of temperature, humidity and atmospheric pressure in the vicinity of the injection molding machine 1 as well as composition of the melt, viscosity of the melt 12, etc.), an embodiment of the present method calls for performing a base comparison V0 between an internal pressure graph 10.M0 of a current production cycle Z0 schematically shown in FIG. 3 and the reference graph 10 schematically shown in FIG. 2. The base comparison V0 determines whether a particular one of a plurality of predefined characteristics of the internal pressure graph 10.M0 of the current production cycle Z0 deviates from the same predefined characteristic of the reference graph 10 by a predefined threshold value. This base comparison V0 is performed by the evaluation unit 16 and is performed independently of the quality control assessment of the finished injection molded part 14 performed by the control unit 15. To this end, at least one evaluation program is run in a processor of the evaluation unit 16. Such a base comparison V0 is useful to detect the effects of variations in the composition and viscosity of the melt 12 as well as the effects of variations in environmental conditions such as pressure, humidity and temperature where the injection molding unit 1 is operating the ongoing cyclic production process. Such a base comparison V0 is also useful to set up a new production process, for example, if an injection molded part 14 that was produced at an earlier time on the injection molding unit 1 is to be produced again, or if a new injection molded part 14 which is similar to an injection molded part 14 that was produced at an earlier time on the injection molding unit 1 is to be produced on the injection molding unit 1.

FIG. 8 schematically shows the steps performed according to embodiments of the method of the invention for assuring the desired quality of the finished molded parts 14 being produced by the injection molding unit 1 during continuous operation of multiple successive cycles Z0, Z1, Z2, etc. The method is carried out using the evaluation program of the evaluation unit 16. The variation of the internal pressure of the cavity of the injection molding unit machine 1 is detected during a current production cycle Z0. An embodiment of the method of the invention calls for representing in the form of a first internal pressure graph 10.M0, the time variation of the detected internal pressure of the cavity during a first production cycle Z0 of the injection molding unit machine 1. The machine parameters M governing operation of the injection molding unit 1 during the current production cycle Z0 are referred to as the current machine parameters M0. In a subsequent step of the method, the base comparison V0 of the internal pressure graph 10.M0 of the current production cycle Z0 to the reference graph 10 is carried out. FIG. 3 schematically shows an exemplary result of a base comparison V0 of the internal pressure graph 10.M0 of the current production cycle Z0 to the reference graph 10.

In this embodiment chosen for illustrating the method of the present invention, the first comparison V0 of the internal pressure graph 10.M0 of the current production cycle Z0 to the reference graph 10 is focused on four different features of the injection molding process as the injection molding machine 1 performs the current production cycle Z0. These four features are: (1) the switchover point $t_{II}$, which is the moment in time when the cavity is completely filled with melt; (2) the maximum internal pressure $p_{max}$ of the cavity; (3) the sealing point pressure $p_{III}$, which is the internal pressure of the cavity when the melt is completely solidified; and (4) the sealing point $t_{III}$, which is the moment in time when the melt is completely solidified and the prue becomes sealed.

In the example according to FIG. 3, the switchover point point $t_{II}$ of the internal pressure graph 10.M0 of the current production cycle Z0 occurs earlier than the switchover point point $t_{II}$ of the reference graph 10. A predefined deviation of preferably 1% of the switchover point $t_{II}$ from the reference graph 10 is used by an embodiment of the method of the present invention as the first threshold value that triggers an adjustment to a predetermined operating parameter M1 of the injection molding machine 1 in a way that tends to diminish the deviation. Thus, if the difference between the time $t_I$ and $t_{II}$ of the reference graph is 10 minutes (600 seconds), and the deviation between the moment $t_{II}$ of the switchover point of the reference graph 10 and the moment $t_{II}$ of the switchover point of the internal pressure graph 10.M0 of the current production cycle Z0 is at least 6 seconds, which in this example is the threshold value (1%) of the deviation of the switchover point, then the method of the present invention calls for adjusting a predetermined machine parameter M1 in a way that tends to diminish the deviation between the moment $t_{II}$ of the reference graph 10 and the moment $t_{II}$ of the internal pressure graph 10.M0 of the current production cycle Z0. Moreover, this predetermined operating parameter M1 of the injection molding machine 1 is chosen as the one parameter M1 that it is likely to have a greater influence on diminishing the particular deviation of the operating characteristic under consideration (switchover point $t_{II}$) than other operating parameters M2, M3, M4 of the injection molding machine 1.

Furthermore, in the example according to FIG. 3 the maximum internal pressure of the internal pressure graph 10.M0 of the current production cycle Z0 is significantly higher than the maximum internal pressure $p_{max}$ of the reference graph 10. A predefined deviation of preferably 5% from the maximum internal pressure $p_{max}$ of the reference graph 10 is used as the second threshold value that triggers an adjustment to a predetermined operating parameter M of the injection molding machine 1 in a way that tends to diminish the deviation. Thus, if the maximum internal pressure $p_{max}$ of the reference graph 10 is 500 bar, and the deviation between the maximum internal pressure $p_{max}$ of the reference graph 10 and the maximum internal pressure $p_{max}$ of the internal pressure graph 10.M0 of the current production cycle Z0 is at least 25 bar, which in this example is the threshold value (5%) of the permitted deviation of the maximum internal pressure $p_{max}$, then the method of the present invention calls for adjusting a predetermined machine parameter M in a way that tends to diminish the deviation between the maximum internal pressure $p_{max}$ of the reference graph 10 and the maximum internal pressure $p_{max}$ of the internal pressure graph 10.M0 of the current production cycle Z0. Moreover, this predetermined operating parameter M of the injection molding machine 1 is chosen as the one parameter M that it is likely to have a greater influence on diminishing the particular deviation of the operating characteristic under consideration (maximum internal pressure $p_{max}$) than other operating parameters M.

Moreover, in the example according to FIG. 3 the internal pressure p of the internal pressure graph 10.M0 of the current production cycle Z0 in the holding phase II and the residual cooling phase III is also higher than that of the reference graph 10. A predefined deviation of preferably 2% of the sealing point pressure $p_{III}$ of the current production cycle Z0 from the sealing point pressure $p_{III}$ of the reference graph 10 at the sealing time $t_{III}$ of the reference graph 10 is used as the third threshold value that triggers an adjustment to a predetermined operating parameter M of the injection molding machine 1 in a way that tends to diminish the deviation. Thus, if the sealing point pressure $p_{III}$ of the reference graph 10 is 200 bar, and the deviation between the sealing point pressure $p_{III}$ of the reference graph 10 and the sealing point pressure $p_{III}$ of the internal pressure graph 10.M0 of the current production cycle Z0 is at least 4 bar, which in this example is the threshold value (2%) of the permitted deviation of the sealing point pressure $p_{III}$, then the method of the present invention calls for adjusting a predetermined machine parameter M in a way that tends to diminish the deviation between the sealing point pressure $p_{III}$ of the reference graph 10 and the sealing point pressure $p_{III}$ of the internal pressure graph 10.M0 of the current production cycle Z0. Moreover, this predetermined operating parameter M of the injection molding machine 1 is chosen as the one parameter M that it is likely to have a greater influence on diminishing the particular deviation of the operating characteristic under consideration (sealing point pressure $p_{III}$) than other operating parameters M.

In the example according to FIG. 3, the attainment of the sealing point $t_{III}$ is used as the fourth threshold value that triggers an adjustment to a predetermined operating parameter M of the injection molding machine 1 in a way that tends to diminish the deviation. Prior to the attainment of the sealing point $t_{III}$, the melt 12 in the region of the sprue of the cavity is not yet solidified and furthermore the shrinkage of the cooling melt is not yet completed. If the holding pressure is released before the sealing point $t_{III}$ is reached, then the shrinkage of the cooling melt will no longer be compensated and this shrinkage of the cooling melt creates spaces between the shrunken melt and the wall defining the cavity. As these spaces are created by the uncompensated shrinkage of the cooling melt, the pressure within the cavity undergoes a characteristic drop that is commensurate with the volume of the spaces created between the shrunken melt and the wall defining the cavity, and this pressure drop can be observed in the internal pressure graph 10.M0 of the current production cycle Z0. This characteristic pressure drop does not occur when the holding pressure is maintained until the sealing point $t_{III}$ is reached. Thus, as shown in FIG. 3, the pressure curve of the reference graph 10 slopes uniformly through the sealing point $t_{III}$. However, this is not the case for the internal pressure graph 10.M0 of the current production cycle Z0 in which there is a sudden downturn in the pressure curve just prior to the attainment of the sealing point $t_{III}$.

Those skilled artisans who have become familiar with the present invention may also choose other aspects of the production cycle as the focus of the deviation that triggers an adjustment in an operating parameter of the injection molding machine 1. Thus, the skilled artisan may use another predefined deviation from any predefined internal pressure p of the reference graph 10 in the holding phase II and/or the residual cooling phase III. Furthermore, the magnitude of the deviation (i.e., the threshold value) that triggers an adjustment in an operating parameter M of the injection molding machine 1 can be selected by the skilled artisan to be a greater or lesser amount as may be required for example by the particular aspect of quality being sought in the finished part or for other reasons.

FIG. 8 schematically represents several aspects of the method of the present invention carried out during successive production cycles of the injection molding unit 1. Thus, the letter "n" in FIG. 8 schematically represents the condition in which the comparison V0 is not successful. According to the method, when the comparison V0 yields an unsuccessful outcome schematically represented by the letter "n" in FIG. 8, one of the operating parameters M of the injection molding unit would undergo an adjustment that would tend to correct the particular feature or portion of the internal pressure graph that was being compared to the reference graph 10. The particular operating parameter M that would be adjusted will depend upon where the particular production cycle Z0 falls in the order of successive production cycles Z0, Z1, Z2, etc. A successful comparison V0 is indicated by the letter "y" in FIG. 8. In a successful comparison V0, none of the threshold values being monitored is exceeded, and accordingly there is not any need for any adjustment of an operating parameter M of the injection molding unit 1 and the process is completed in process step E. In the example according to FIG. 3, the internal pressure graph 10.M0 of the current production cycle Z0 exceeds all four threshold values.

If in the method according to the invention for reproducing the injection molded part quality in injection molding, the internal pressure graph 10.M0 of the current production cycle Z0 exceeds one of the threshold values, then an internal pressure graph 10.M1 to 10.M4 of a next successive production cycle Z1 is adjusted to the reference graph 10 by changing a machine parameter M1. Thus, the particular machine parameter M (1, 2, 3 or 4) to be adjusted will depend on the current production cycle's order (1, 2, 3, 4) in the succession of multiple production cycles (Z0, Z1, Z2, etc.). Adjusting of the internal pressure graph 10.M1 to 10.M4 of a subsequent production cycle Z1 to Z4 to the reference graph 10 by changing a machine parameter M is carried out by the evaluation program of the evaluation unit 16. The internal pressure graphs 10, 10.M0, 10.M1, 10.M2, 10.M3 and 10.M4 are displayed on the output unit of the evaluation unit 16.

To this end, at least one machine parameter M1 to M4 is assigned to each phase I to III of the production cycle. However, in accordance with an aspect of the present invention, the particular one of the available machine operating parameters M1 to M4 that will be adjusted when the comparison yields the triggering deviation, will be that particular machine parameter M that has a stronger impact on the internal pressure p in phase I to III of the production cycle than each of the non-assigned machine parameters M. As the first machine parameter M1, the injection speed with which melt is provided into the cavity of the injection molding machine 1 is assigned to the injection phase I of the current production cycle Z0. Thus, if the comparison V0 in FIG. 8 yields a deviation in the switchover point $t_{II}$, then the injection speed is the first machine parameter M1 that will be adjusted in a way that tends to diminish the deviation in the switchover point $t_{II}$. However, if the comparison V0 in FIG. 8 determines that the switchover point $t_{II}$ does not deviate by the first threshold value from the switchover point $t_{II}$ in the reference pressure graph 10, then the comparison V0 moves on to evaluate the holding pressure level in the cavity.

As the second machine parameter M2, the holding pressure level is assigned to the holding pressure phase II of the current production cycle Z0. Thus, if the comparison V0 in FIG. 8 yields a deviation in the maximum internal pressure $p_{max}$ of the cavity, then the holding pressure level in the cavity is the second machine parameter M2 that will be adjusted in a way that tends to diminish the deviation in the maximum internal pressure $p_{max}$ of the cavity. However, if the comparison V0 in FIG. 8 determines that the maximum internal pressure $p_{max}$ does not deviate by the second threshold value from the maximum internal pressure $p_{max}$ in the reference pressure graph 10, then the comparison V0 moves on to evaluate the cooling rate of the cavity in the holding phase II of the current production cycle Z0.

As the third machine parameter M3, a tool temperature, which is the temperature of the tool that defines the cavity of the injection molding unit 1, is assigned to the holding phase II of the current production cycle Z0. Thus, if the comparison V0 in FIG. 8 yields a deviation in the duration of the holding cooling phase II, then the cooling rate of the cavity is the third machine parameter M3 that will be adjusted in a way that tends to diminish the deviation in the duration of the holding phase II. However, if the comparison V0 in FIG. 8 determines that the cooling rate does not deviate by the third threshold value from the cooling rate in the reference pressure graph 10, then the comparison V0 moves on to evaluate the holding pressure time in the residual cooling phase III of the current production cycle Z0.

Furthermore, as the fourth machine parameter M4, the holding pressure time is assigned to the residual cooling phase III of the current production cycle Z0. Thus, if the comparison V0 in FIG. 8 yields a deviation in the duration of the residual cooling phase III, then the cooling rate of the cavity is the fourth machine parameter M4 that will be adjusted in a way that tends to diminish the deviation in the duration of the residual cooling phase III. This assigning of the machine parameters M1 to M4 to a particular one of the phases I to III is performed by the evaluation program of the evaluation unit 16.

The assigned machine parameters M1 to M4 are changed in a plurality of successive production cycles Z1 to Z4 (schematically shown in FIG. 8) in a predefined order. Preferably, a respective comparison V1 to V4 is carried out after each of the respective production cycles Z1 to Z4 to evaluate whether an internal pressure graph 10.M1 to 10.M4 of a subsequent production cycle Z1 to Z4 exceeds a predefined threshold value indicative of a deviation that produces an unsatisfactory finished part. A successful comparison V1 to V4 is indicated by the letter "y" in FIG. 8 and means that there was not any deviation to the extent of the predefined threshold value under consideration in that particular comparison V1 to V4. An unsuccessful comparison V1 to V4 is indicated by the letter "n" in FIG. 8 and means that a deviation was found in the extent of the predefined threshold value under consideration in that particular comparison V1 to V4. Changing of the assigned machine parameters M1 to M4 and comparing whether an internal pressure graph 10.M1 to 10.M4 of a subsequent production cycle Z1 to Z4 exceeds a predefined threshold value is carried out by the evaluation program of the evaluation unit 16.

According to one embodiment of the invention, exactly one assigned machine parameter M1 to M4 is changed per production cycle Z0 to Z4. The predefined order in successive production cycles Z0 to Z4 is: first machine parameter M1, second machine parameter M2, third machine parameter M3, fourth machine parameter M4 and then repeating with the first machine parameter M1. The internal pressure graphs 10.M0 to 10.M4 recorded in each production cycle Z0 to Z4 are represented in FIGS. 4 to 7. To illustrate the impact that a change of an assigned machine parameter M1 to M4 has on the internal pressure graph 10.M1 to 10.M4 of a subsequent production cycle Z1 to Z4, the internal pressure graph 10.M0 of the current production cycle Z0 and the reference graph 10 entered are also shown in FIGS. 4 to 7.

The injection molding unit 1 is operated by an operator who is able to set a value of a machine parameter M1 to M4 by means of the control device 11' schematically shown in FIG. 1. The control device 11' also is configured to enable the operator to change the machine parameters M1 to M4 of the injection molding unit 1. Moreover, the operator can check the predefined quality characteristic on the control unit 15. An internal pressure graph detected and/or a reference graph 10 is displayed to the operator on the output device that forms part of the evaluation unit 16. A result of a comparison V0 to V4 is displayed to the operator on the output device. The at least one machine parameter M1 to M4 assigned to a phase I to III is displayed to the operator on the output device. Also, a value of an assigned machine parameter M1 to M4 to be changed is displayed to the operator on the output device. Moreover, values of the assigned machine parameters M1 to M4 to be changed are displayed to the operator on the output device in a predefined order. Thus, in one exemplary embodiment of the present invention, the operator serves as a link between the evaluation unit 16 and the control unit 11'. By means of the control device 11' the operator can enter values of the assigned machine parameters M1 to M4 to be changed in the predefined order. However, those skilled artisans who have become familiar with the present invention will appreciate that the evaluation unit 16 can be programmed to interact directly with the control device 11' so as to automatically change the assigned machine parameter M1 to M4 without intervention by the operator of the injection molding unit 1. For this purpose, as schematically shown in FIG. 1, the evaluation unit 16 and the control device 11' may be connected to each other via an electronic interface 17, for example.

Referring to FIG. 8, if the base comparison V0 made at the conclusion of the base production cycle Z0 detects a deviation from the reference graph 10, then at least one of the operating parameters M1 to M4 will be changed before the next successive production cycle Z1 will begin, and desirably the particular operating parameter that is to be changed will be displayed on an output device for the benefit of the operator of the injection molding unit 1. In a first subsequent production cycle Z1 schematically shown in FIG. 8, the particular operating parameter M1 that is to be changed is for example the injection speed of the injection phase I of the production cycle Z1. A value of the injection speed to be changed is displayed to the operator on the output device. If the switchover point of the internal pressure graph 10.M0 of the current production cycle Z0 is earlier than the switchover point $t_{II}$ of the reference graph 10, then the injection speed is changed by reducing it. This reduction in the injection speed can be performed manually by the operator or can be performed automatically by the evaluation unit 16 interacting directly with the control device 11'. As schematically shown for example in FIG. 3, the injection speed of the current production cycle Z0 is reduced by a predetermined magnitude such as 2% in the first subsequent production cycle Z1.

Figure 4:
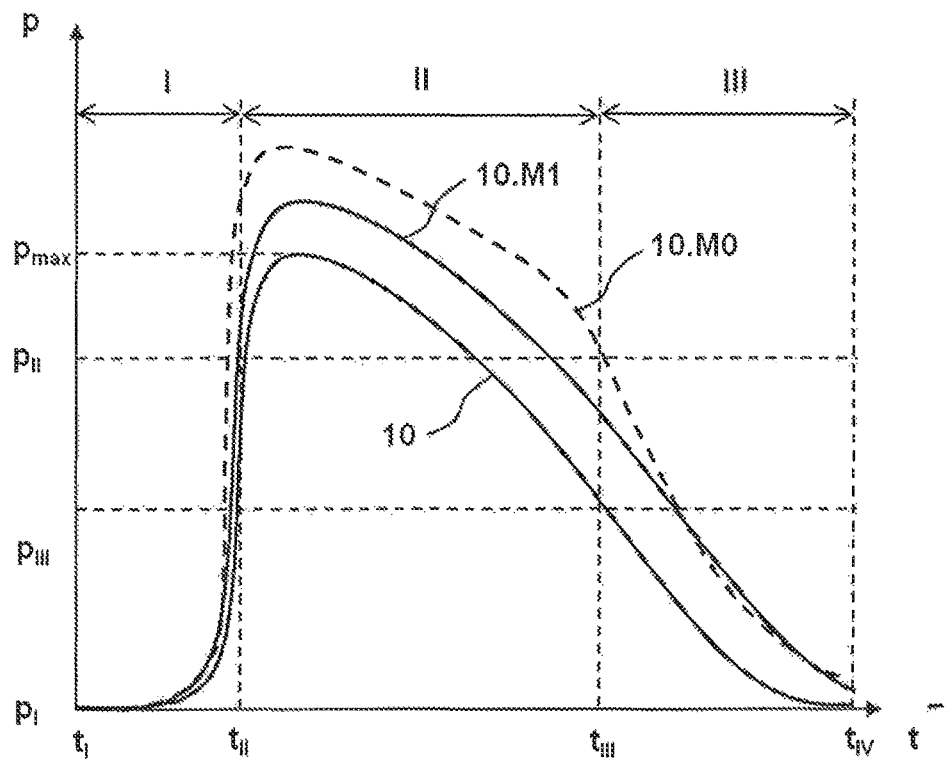
FIG. 4 is a graphic representation of the reference graph according to FIG. 2 and the internal pressure graph of the current production cycle according to FIG. 3 as well as an internal pressure graph of a first subsequent production cycle of the injection molding unit according to FIG. 1 where the first machine parameter is changed.
Figure 5:
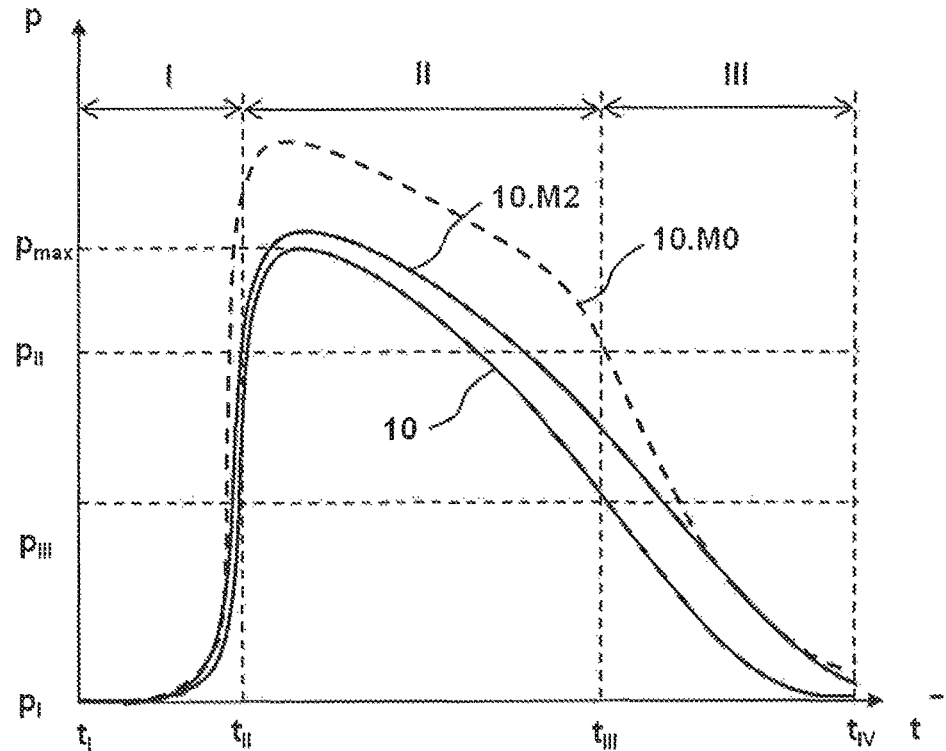
FIG. 5 is a graphic representation of the reference graph according to FIG. 2 and the internal pressure graph of the current production cycle according to FIG. 3 as well as an internal pressure graph of a second subsequent production cycle of the injection molding unit according to FIG. 1 where the second machine parameter is changed.

As schematically shown in FIG. 8, at the completion of the first subsequent production cycle Z1, a first comparison V1 focuses on a first feature of the reference graph 10 to determine whether the internal pressure graph 10.M1 of the injection molding unit operating in the first subsequent production cycle Z1 with the injection speed reduced by 2% from the prior production cycle Z0, differs from the reference pressure graph 10 by a deviation that exceeds the magnitude of the predefined threshold value. An exemplary result of the first comparison V1 is schematically shown in FIG. 4. A deviation from the switchover point $t_{II}$ of the reference graph 10 by a predefined magnitude is used as the first threshold value. In the example according to FIG. 4, reducing the injection speed causes the switchover point $t_{II}$ of the internal pressure graph 10.M1 of the first subsequent production cycle Z1 to occur later than the switchover point $t_{II}$ of the internal pressure graph 10.M0 of the base production cycle Z0. However, the switchover point $t_{II}$ of the internal pressure graph 10.M1 of the first subsequent production cycle Z1 still occurs earlier than the switchover point $t_{II}$ of the reference graph 10. Moreover, the switchover point $t_{II}$ of the internal pressure graph 10.M1 of the first subsequent production cycle Z1 deviates from the switchover point of the reference graph 10 by more than the predefined deviation. This means that the first comparison V1 yields a result indicating that the adjustment of the injection speed was not sufficient to guide operation of the injection molding unit 1 to produce a part that satisfies the desired standard of quality.

If the switchover point of the internal pressure graph 10.M0 of the base production cycle Z0 occurs later than the switchover point $t_{II}$ of the reference graph 10, then the injection speed is changed by increasing the injection speed. For example, the injection speed of the first subsequent production cycle Z1 is increased to become 2% faster than the injection speed that was set as the machine operating parameter during the base production cycle Z0.

As schematically shown in FIG. 8, a first comparison V1 determines whether the internal pressure graph 10.M1 of the first subsequent production cycle Z1 detected with the increased injection speed exceeds the first threshold value. If the first comparison V1 is successful, then the adjusting method of the present invention does not call for any further adjustments to any of the operating parameters M1 to M4 of the injecting molding unit 1 and accordingly the adjustment process can be completed in process step E as schematically shown in FIG. 8.

In a second subsequent production cycle Z2 schematically shown in FIG. 8, the holding pressure level of the holding pressure phase II is changed. A value of the holding pressure level to be changed is displayed on the output device. If a maximum internal pressure $p_{max}$ of the internal pressure graph 10.M1 of the first subsequent production cycle Z1 is higher than the maximum internal pressure $p_{max}$ of the reference graph 10, then the holding pressure level is changed by decreasing it. This is the case in the example shown in FIG. 4. For example, the holding pressure level of the second subsequent production cycle Z2 is decreased by 10% relative to the current production cycle Z0.

As schematically shown in FIG. 8, a second comparison V2 determines whether the internal pressure graph 10.M2 of the second subsequent production cycle Z2 detected with the decreased holding pressure level exceeds a second threshold value. In an exemplary result of the second comparison V2 shown in FIG. 5, a predefined deviation from the maximum internal pressure $p_{max}$ of the reference graph 10 is used as the second threshold value. In the example shown in FIG. 5, decreasing of the holding pressure level causes the internal pressure graph 10.M2 of the second subsequent production cycle Z2 to exhibit a significantly lower maximum internal pressure $p_{max}$ than the internal pressure graph 10.M0 of the current production cycle Z0. The maximum internal pressure $p_{max}$ of the internal pressure graph 10.M2 of the second subsequent production cycle Z2 deviates less from the maximum internal pressure $p_{max}$ of the reference graph 10 than the second threshold value that has been predefined. This means that the outcome of the second comparison V2 is successful. With a successful second comparison V2, then the method of the present invention does not call for any further adjustments to the operation of the injecting molding unit 1 and accordingly the adjustment method of the present invention can be completed in process step E.

If the maximum internal pressure $p_{max}$ of the internal pressure graph 10.M1 of the first subsequent production cycle Z1 is lower than the maximum internal pressure $p_{max}$ of the reference graph 10, then the holding pressure level is changed by increasing the holding pressure level. For example, the holding pressure level of the second subsequent production cycle Z2 is increased by 5% compared to the current production cycle Z0. As schematically shown in FIG. 8, a second comparison V2 determines whether the internal pressure graph 10.M2 that is detected during the second subsequent production cycle Z2 when the injection molding unit 1 is operating with the increased holding pressure level, exceeds the second threshold value.

In a third subsequent production cycle Z3, the machine parameter M3 that is to be changed is the tool temperature during the holding pressure phase II and the residual cooling phase III. A value of the tool temperature to be changed is displayed on the output device. If the internal pressure p of the internal pressure graph 10.M2 of the second subsequent production cycle Z2 is higher than a predefined internal pressure p of the reference graph 10 during the holding phase II and the residual cooling phase III, then the tool temperature is changed by decreasing it. This is the case for the example shown in FIG. 5. For example, the tool temperature of the third subsequent production cycle Z3 is decreased by 2% compared to the current production cycle Z0.

Figure 6:
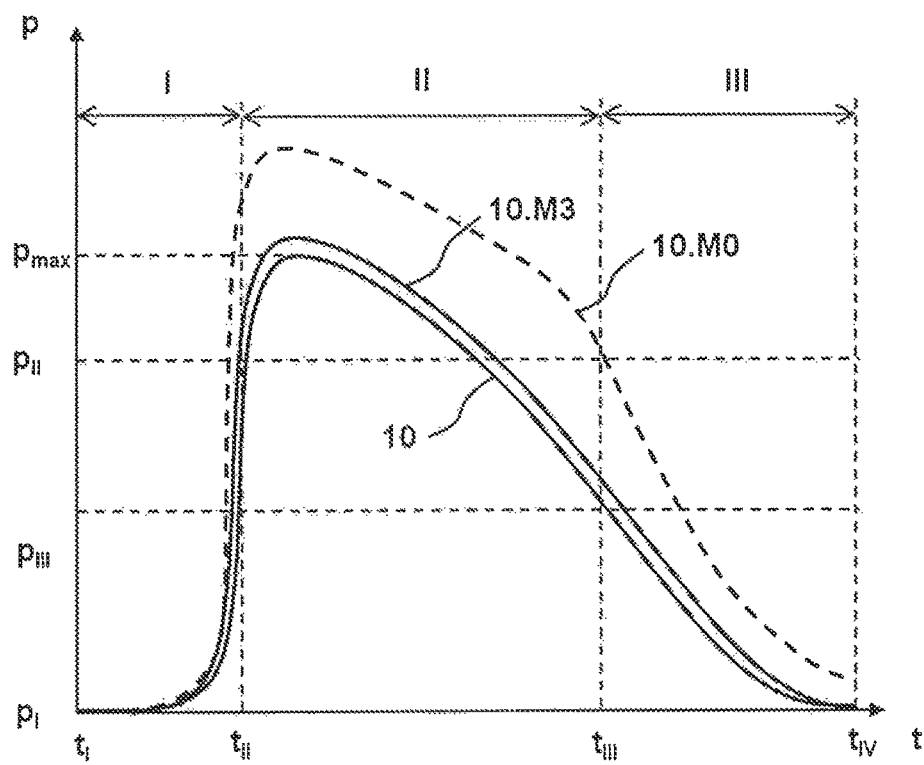
FIG. 6 is a graphic representation of the reference graph according to FIG. 2 and the internal pressure graph of the current production cycle according to FIG. 3 as well as an internal pressure graph of a third subsequent production cycle of the injection molding unit according to FIG. 1 where the third machine parameter is changed.

As schematically shown in FIG. 8, a third comparison V3 determines whether the internal pressure graph 10.M3 of the third subsequent production cycle Z3 detected with the lowered tool temperature is above the third threshold value. An exemplary result of the third comparison V3 is shown in FIG. 6. A predefined deviation from a predefined internal pressure p of the reference graph 10 in the holding phase II and/or the residual cooling phase III is used as the third threshold value. Preferably, a predefined deviation of the internal pressure p from the sealing point pressure $p_{III}$ of the reference graph 10 at the sealing point $t_{III}$ of the reference graph 10 is used as the third threshold value. In the example according to FIG. 6, decreasing of the tool temperature causes the internal pressure graph 10.M3 of the third subsequent production cycle Z3 to exhibit a significantly lower internal pressure p than the internal pressure graph 10.M0 of the current production cycle Z0. Furthermore, the internal pressure p of the internal pressure graph 10.M3 deviates less than the predefined threshold value from the sealing point pressure $p_{III}$ of the reference graph 10 at the sealing point $t_{III}$ of the reference graph 10. This means that the third comparison V3 is successful, which is schematically represented by the letter "y" in FIG. 8. As schematically shown in FIG. 8, with a successful third comparison V3, then the method of the present invention does not call for any further adjustments to the operating parameter M3 of the injecting molding unit 1 and accordingly the adjustment method of the present invention can be completed in process step E.

If the internal pressure p of the internal pressure graph 10.M2 of the second subsequent production cycle Z2 is lower by more than the predefined threshold value at the sealing point $t_{III}$ than the sealing point pressure $p_{III}$ of the reference graph 10, then the tool temperature operating parameter M3 of the injection molding unit 1 is changed by increasing the tool temperature. For example, the tool temperature of the third subsequent production cycle Z3 is increased by 2% compared to the current production cycle Z0. As schematically shown in FIG. 8, a third comparison V3 determines whether the internal pressure graph 10.M3 of the third subsequent production cycle Z3 detected with the increased tool temperature exceeds the third threshold value.

In a fourth subsequent production cycle Z4 schematically shown in FIG. 8, the holding pressure time of the residual cooling phase III is changed. A value of the holding pressure time to be changed is displayed on the output device. The holding pressure time is changed by increasing or reducing it. For example, in the fourth subsequent production cycle Z4, the holding pressure time is reduced by 2% from the holding pressure time of the third successive production cycle Z3.

Figure 7:
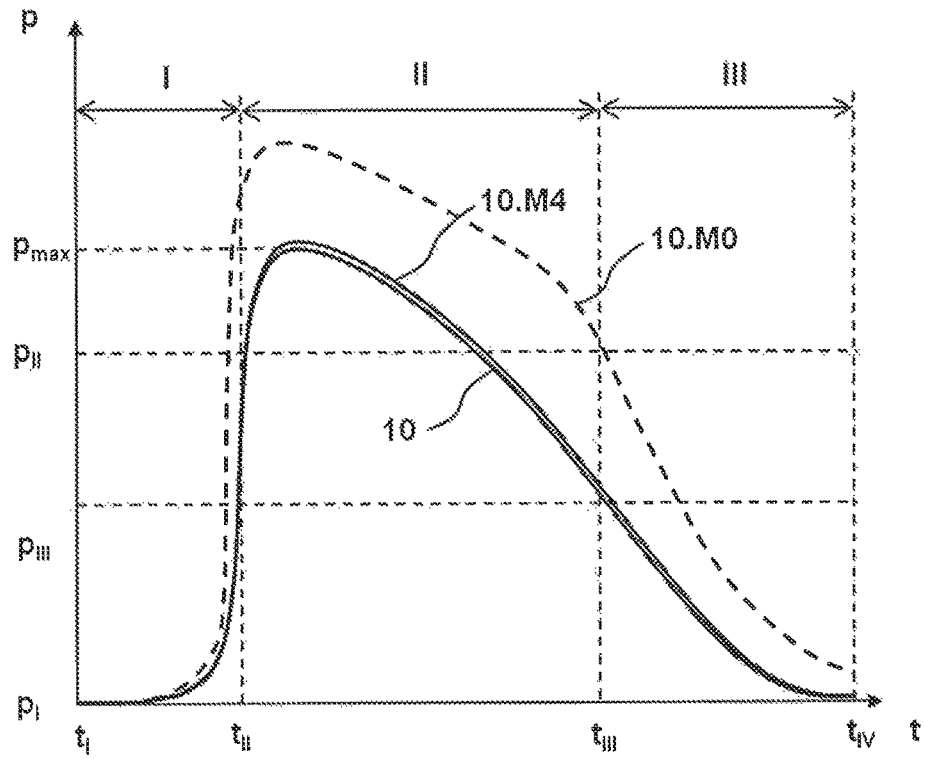
FIG. 7 is a graphic representation of the reference graph according to FIG. 2 and the internal pressure graph of the current production cycle according to FIG. 3 as well as an internal pressure graph of a fourth subsequent production cycle of the injection molding unit according to FIG. 1 where the fourth machine parameter is changed.

FIG. 7 schematically shows the internal pressure graph 10.M4 detected during the fourth subsequent production cycle Z4. Compared to the internal pressure graph 10.M3 of the third subsequent production cycle Z3 shown in FIG. 6, the decreased holding pressure time leads to a faster drop in internal pressure p in the internal pressure graph 10.M4 of the fourth subsequent production cycle Z4.

As schematically shown in FIG. 8, a fourth comparison V4 determines whether the internal pressure graph 10.M4 of the fourth subsequent production cycle Z4 detected with the decreased holding pressure time exceeds a fourth threshold value. An exemplary result of the fourth comparison V4 is shown in FIG. 7. Reaching the sealing point pressure is used as the fourth threshold value. Once the sealing point pressure $p_{III}$ is reached and the melt is solidified in the region of the sprue, then it is not possible for any more melt to flow into the cavity to compensate for the shrinkage in the melt caused by the cooling effect, and also the holding pressure time is kept as short as possible to achieve the shortest possible cycle time. In the example schematically shown in FIG. 7, reducing the holding pressure time results in the internal pressure graph 10.M4 of the fourth subsequent production cycle Z4 exhibiting no characteristic pressure drop at the sealing point pressure $p_{III}$. This means that the fourth comparison V4 yields a successful outcome schematically represented in FIG. 8 by the letter "y" and that in the fourth subsequent production cycle Z4 the sealing point pressure $p_{III}$ will be attained without exceeding the fourth threshold value.

If the fourth comparison V4 yields an outcome that is not successful and is indicative that the increased holding pressure time during the fourth subsequent production cycle Z4 has not enabled the sealing point pressure $p_{III}$ to be attained without exceeding the fourth threshold value, then the first machine parameter M1 of the predefined order is changed again in another first subsequent production cycle Z1 as schematically shown in FIG. 8.

Once again, the injection speed is changed by decreasing or increasing it by a larger magnitude than in the first subsequent production cycle Z1. For example, the injection speed of the first subsequent production cycle Z1 is now decreased by 3% as compared to the current production cycle Z0. If the fourth comparison V4 is unsuccessful, then such an iteration with gradually decreasing or increasing injection speeds may be performed multiple times. Preferably, the injection speed is gradually decreased or increased up to five times. If the fourth comparison V4 is unsuccessful even after the injection speed was gradually decreased or increased five times, then the process is terminated.

LIST OF REFERENCE CHARACTERS 1 injection molding unit
10 reference graph
10.M0 current internal pressure graph
10.M1-10.M4 internal pressure graph with assigned machine parameter changed
11 injector
11' control device
12 melt
13 injection mold
14 injection molded part
15 control unit
16 evaluation unit
17 electronic interface
E end of adapting internal pressure graph
I injection phase
II holding pressure phase
III residual cooling phase
n unsuccessful comparison
p internal pressure
$p_I$ internal pressure at beginning of injection phase
$p_{II}$ filling pressure
$p_{III}$ sealing point pressure
$p_{max}$ maximum internal pressure
t time
$t_I$ start of injection phase
$t_{II}$ switchover point
$t_{III}$ sealing point
$t_{IV}$ end of residual cooling phase
V0 to V4 comparisons 1 to 4 of internal pressure graphs
M machine parameter
M0 current machine parameter
M1 to M4 assigned machine parameter
y successful comparison
Z0 to Z4 production cycles

What is claimed is:

1. A method for adjusting operation of an injection molding machine so that the machine produces finished injected molded parts that are within a range of acceptable quality, wherein each production cycle performed by the machine includes in succession an injection phase in which a melt is injected under pressure into a cavity of an injection mold, a holding pressure phase during which the molten melt cools down and is solidified, and a residual cooling phase during which the solidified melt continues to cool down within the cavity prior to ejection from the cavity, the method comprising the steps of:
   using as a reference graph, an internal pressure graph of the cavity during a production cycle that produces a finished injection molded part having a characteristic that satisfies a predefined quality;
   defining in the reference graph, a first feature, a second feature, a third feature and a fourth feature, wherein each feature is readily identifiable in each production cycle of the injection molding machine;
   operating the injection molding machine during a first production cycle to produce a first finished part;
   representing in a form of a first internal pressure graph, a time variation of a detected internal pressure of the cavity during the first production cycle of the machine;
   upon determining that the first feature in the first internal pressure graph deviates from the first feature in the reference graph by at least a first quantitative deviation, then before beginning a second production cycle of the machine in immediate succession of the first production cycle of the machine, changing a first operating parameter of the machine by a first magnitude that tends to diminish the first quantitative deviation during the second production cycle of the machine;
   operating the injection molding machine during a second production cycle in immediate succession of the first production cycle of the machine;
   representing in the form of a second internal pressure graph, the time variation of the detected internal pressure of the cavity during the second production cycle of the machine;

upon determining that the second feature in the second internal pressure graph deviates from the second feature in the reference graph by at least a second quantitative deviation, then before beginning a third production cycle of the machine in immediate succession of the second production cycle of the machine, changing a second operating parameter of the machine by a second magnitude that tends to diminish the second quantitative deviation during the third production cycle of the machine;

operating the injection molding machine during a third production cycle in immediate succession of the second production cycle of the machine;

representing in the form of a third internal pressure graph, the time variation of the detected internal pressure of the cavity during the third production cycle of the machine;

upon determining that the third feature in the third internal pressure graph deviates from the third feature in the reference graph by at least a third quantitative deviation, then before beginning a fourth production cycle of the machine in immediate succession of the third production cycle of the machine, changing a third operating parameter of the machine by a third magnitude that tends to diminish the third quantitative deviation during the fourth production cycle of the machine;

operating the injection molding machine during a fourth production cycle in immediate succession of the third production cycle of the machine;

representing in the form of a fourth internal pressure graph, the time variation of the detected internal pressure of the cavity during the fourth production cycle of the machine; and upon determining that the fourth feature in the fourth internal pressure graph deviates from the fourth feature in the reference graph by at least a fourth quantitative deviation, then before beginning a fifth production cycle of the machine in immediate succession of the fourth production cycle of the machine, changing a fourth operating parameter of the machine by a fourth magnitude that tends to diminish the fourth quantitative deviation during the fifth production cycle of the machine.

2. The method according to claim 1, further comprising the steps of:

operating the injection molding machine during a fifth production cycle in immediate succession of the fourth production cycle of the machine;

representing in the form of a fifth internal pressure graph, the time variation of the detected internal pressure of the cavity during the fifth production cycle of the machine;

upon determining that the first feature in the fifth internal pressure graph deviates from the first feature in the reference graph by at least the first quantitative deviation, then before beginning a sixth production cycle of the machine in immediate succession of the fifth production cycle of the machine, changing the first operating parameter of the machine by a magnitude greater than the first magnitude and in a way that tends to diminish the first quantitative deviation during the sixth production cycle of the machine.

3. The method according to claim 1, wherein the first operating parameter of the machine has greater impact in diminishing the first quantitative deviation than does any of the second operating parameter of the machine, the third operating parameter of the machine and the fourth operating parameter of the machine.

4. The method according to claim 1, wherein the second operating parameter of the machine has greater impact in diminishing the second quantitative deviation than does any of the first operating parameter of the machine, the third operating parameter of the machine and the fourth operating parameter of the machine.

5. The method according to claim 1, wherein the third operating parameter of the machine has greater impact in diminishing the third quantitative deviation than does any of the first operating parameter of the machine, the second operating parameter of the machine and the fourth operating parameter of the machine.

6. The method according to claim 1, wherein the fourth operating parameter of the machine has greater impact in diminishing the fourth quantitative deviation than does any of the first operating parameter of the machine, the second operating parameter of the machine and the third operating parameter of the machine.

7. The method according to claim 1, wherein the first quantitative deviation relates to the injection phase of the first production cycle of the machine and the first operating parameter of the machine is the injection speed with which the melt is injected under pressure into a cavity of an injection mold of the machine.

8. The method according to claim 1, wherein the moment in time when the cavity is completely filled with melt is deemed the switchover point, and wherein the first quantitative deviation is a 1% deviation between the moment when the switchover point occurs in the reference graph and the moment when the switchover point occurs in the first internal pressure graph.

9. The method according to claim 8, wherein if the switchover point of the internal pressure graph of the first production cycle is at least 1% earlier than the switchover point of the reference graph, then the injection speed is changed by reducing the injection speed.

10. The method according to claim 8, wherein if the switchover point of the internal pressure graph of the first production cycle occurs at least 1% later than the switchover point of the reference graph, then the injection speed is changed by increasing the injection speed.

11. The method according to claim 1, wherein the second quantitative deviation relates to the holding pressure phase of the first production cycle of the machine and the second operating parameter of the machine is the holding pressure in the cavity of an injection mold of the machine during which the molten melt cools down and is solidified.

12. The method according to claim 1, wherein the second quantitative deviation is a 5% deviation between the maximum internal pressure of the cavity recorded in the reference graph and the maximum internal pressure of the cavity recorded in the first internal pressure graph.

13. The method according to claim 1, wherein the internal pressure of the cavity when the melt is completely solidified is deemed the sealing point pressure, and wherein the third quantitative deviation is a 2% deviation between the sealing point pressure of the cavity recorded in the reference graph and the sealing point pressure of the cavity recorded in the first internal pressure graph.

14. The method according to claim 13, wherein a tool temperature of the cavity is monitored, wherein the third quantitative deviation relates to the holding pressure phase of the first production cycle of the machine during which the melt cools down within the cavity of an injection mold of the machine and becomes solidified, and the third operating parameter of the machine is the tool temperature.

15. The method according to claim 1, wherein the fourth quantitative deviation relates to the residual cooling phase of the first production cycle of the machine during which the solidified melt continues to cool down within the cavity of an injection mold of the machine, and the fourth operating parameter of the machine is the holding pressure time.

16. The method according to claim 15, wherein the moment in time when the melt is completely solidified is deemed the sealing point, and wherein the fourth quantitative deviation is a 1% deviation between the moment when the sealing point occurs in the reference graph and the moment when the sealing point occurs in the first internal pressure graph.

\* \* \* \* \*